(12) United States Patent
Bartlett et al.

(10) Patent No.: US 12,460,301 B2
(45) Date of Patent: Nov. 4, 2025

(54) CATALYST SOLUTION FOR ELECTROLESS PLATING DEVOID OF AN AMINE

(71) Applicant: The Boeing Company, Chicago, IL (US)

(72) Inventors: Katharine Anne Bartlett, St. Charles, MO (US); Scott R. Johnston, St. Louis, MO (US); Zachlyn Nell Farwig, Fenton, MO (US); Joseph A. Norris, Jr., St. Louis, MO (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 17/654,923

(22) Filed: Mar. 15, 2022

(65) Prior Publication Data

US 2023/0295808 A1    Sep. 21, 2023

(51) Int. Cl.
| | |
|---|---|
| *C23C 18/52* | (2006.01) |
| *B01J 31/02* | (2006.01) |
| *B01J 31/22* | (2006.01) |
| *C23C 18/16* | (2006.01) |

(52) U.S. Cl.
CPC .......... *C23C 18/52* (2013.01); *B01J 31/0201* (2013.01); *B01J 31/0204* (2013.01); *B01J 31/0208* (2013.01); *B01J 31/2226* (2013.01); *C23C 18/1608* (2013.01); *B01J 2531/824* (2013.01)

(58) Field of Classification Search
None
See application file for complete search history.

(56) References Cited

U.S. PATENT DOCUMENTS

| | | | |
|---|---|---|---|
| 3,423,226 A | 1/1969 | Jensen | |
| 3,437,507 A | 4/1969 | Jensen | |
| 5,053,280 A * | 10/1991 | Takanezawa | C23C 18/206 428/209 |
| 6,344,242 B1 | 2/2002 | Stolk et al. | |
| 8,404,097 B2 | 3/2013 | Ware | |
| 9,217,093 B1 * | 12/2015 | Wu | C09D 11/322 |
| 10,787,743 B2 | 9/2020 | Paesano | |
| 2005/0022692 A1 * | 2/2005 | Eu | C23C 18/2066 106/1.11 |

FOREIGN PATENT DOCUMENTS

| | | |
|---|---|---|
| EP | 2559486 B1 | 4/2017 |
| JP | 2006219752 A | 8/2006 |

OTHER PUBLICATIONS

Extended European Search Report, dated Oct. 16, 2023, regarding EP Application No. 23157540.8, 13 pages.
European Patent Office Partial Search Report, dated Jul. 13, 2023, regarding Application No. EP23157540.8, 15 pages.

* cited by examiner

*Primary Examiner* — Jeffrey D Washville
(74) *Attorney, Agent, or Firm* — Yee & Associates, P.C.

(57) ABSTRACT

A catalyst solution for electroless plating is provided. The catalyst solution is printable and devoid of an amine. The catalyst solution comprises a catalytic metal salt, a solvent, and an epoxy.

23 Claims, 8 Drawing Sheets

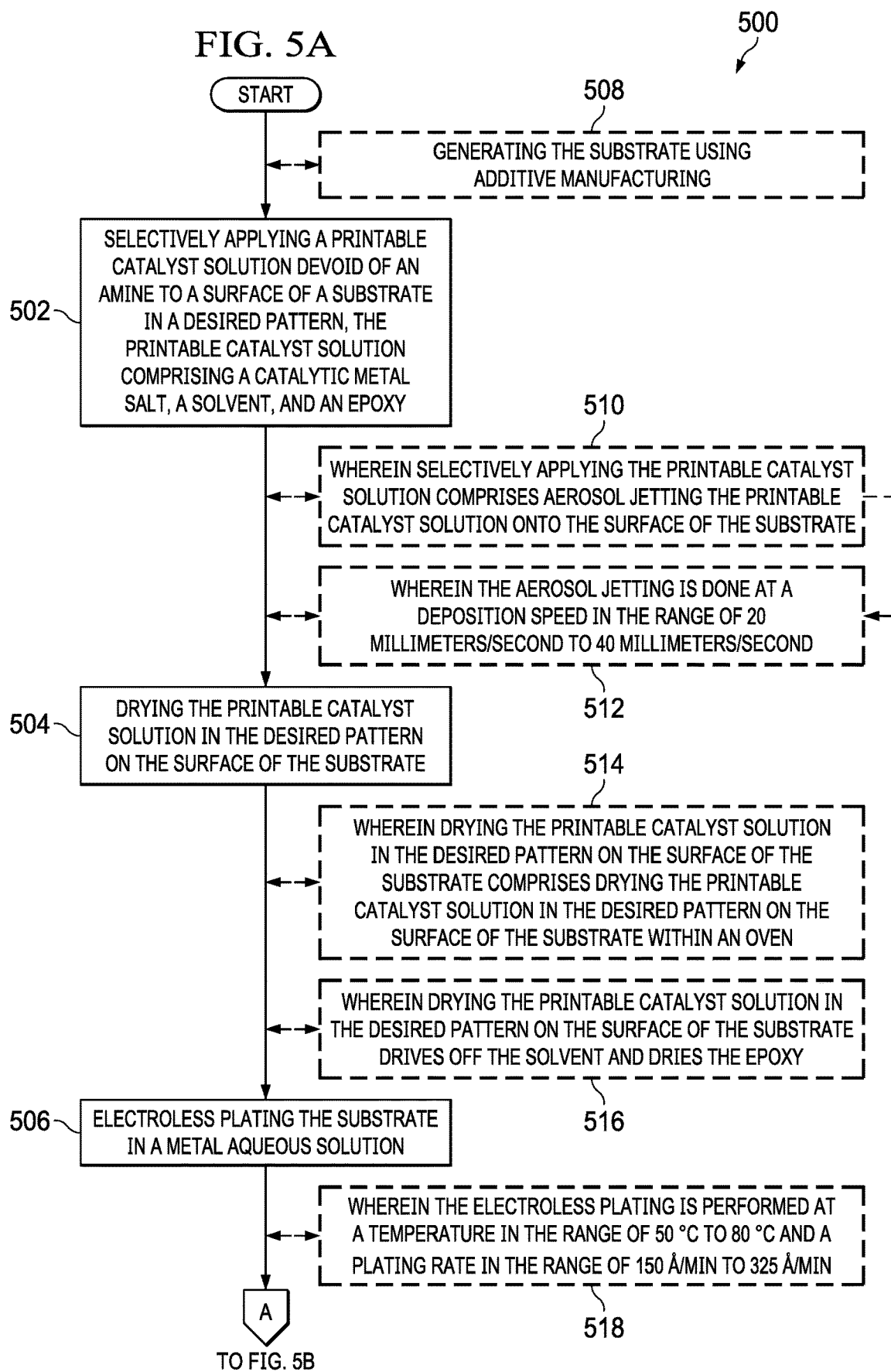

CATALYST SOLUTION FOR ELECTROLESS PLATING DEVOID OF AN AMINE

BACKGROUND INFORMATION

1. Field

The present disclosure relates generally to bonding metal to a substrate, and more particularly, to formulations and methods for creating and using a catalyst solution for electroless plating on a substrate.

2. Background

As technology evolves, demand increases for smaller, more flexible, and hidden circuitry and conductive features. Additionally, economic and environmental motivations make removing or simplifying manufacturing steps desirable. Economic and environmental factors also make eliminating or reducing sacrificial materials in manufacturing desirable.

Therefore, it would be desirable to have a method and apparatus that takes into account at least some of the issues discussed above, as well as other possible issues.

SUMMARY

An embodiment of the present disclosure provides a catalyst solution for electroless plating, wherein the catalyst solution is printable and devoid of an amine. The catalyst solution comprises a catalytic metal salt, a solvent, and an epoxy.

Another embodiment of the present disclosure provides a method of directly writing a desired pattern of metal on a surface of a substrate. A printable catalyst solution devoid of an amine is selectively applied to a surface of a substrate in a desired pattern. The catalyst solution comprises a catalytic metal salt, a solvent, and an epoxy. The catalyst solution is dried in the desired pattern on the surface of the substrate. The substrate is electrolessly plated in a metal aqueous solution.

Yet another embodiment of the present disclosure provides a component. The component comprises a substrate having a surface, a desired pattern of metal nanoparticles and epoxy on the surface of the substrate, and a metal film formed over only the desired pattern but not exposed portions of the surface of the substrate.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 5A and 5B are a flowchart of a method of directly writing a desired pattern of metal on a surface of a substrate in accordance with an illustrative embodiment;

DETAILED DESCRIPTION

The illustrative examples recognize and take into account one or more different considerations. The illustrative examples recognize and take into account that current methods of forming circuitry utilize lithography and masking techniques that increase manufacturing time, cost, and waste. The illustrative examples also recognize and take into account that conventional direct writing techniques for conductive traces may not provide sufficient conductivity for some applications. The illustrative examples also recognize and take into account that conventional metal trace deposition techniques cannot enable desired technologies.

The illustrative examples present a method of forming a desired pattern on a substrate with a metal trace. The illustrative examples present a catalyst solution for electroless plating, wherein the catalyst solution is printable and devoid of an amine. The illustrative examples present a method of directly writing a desired pattern of metal on a surface of a substrate.

Figure 1:
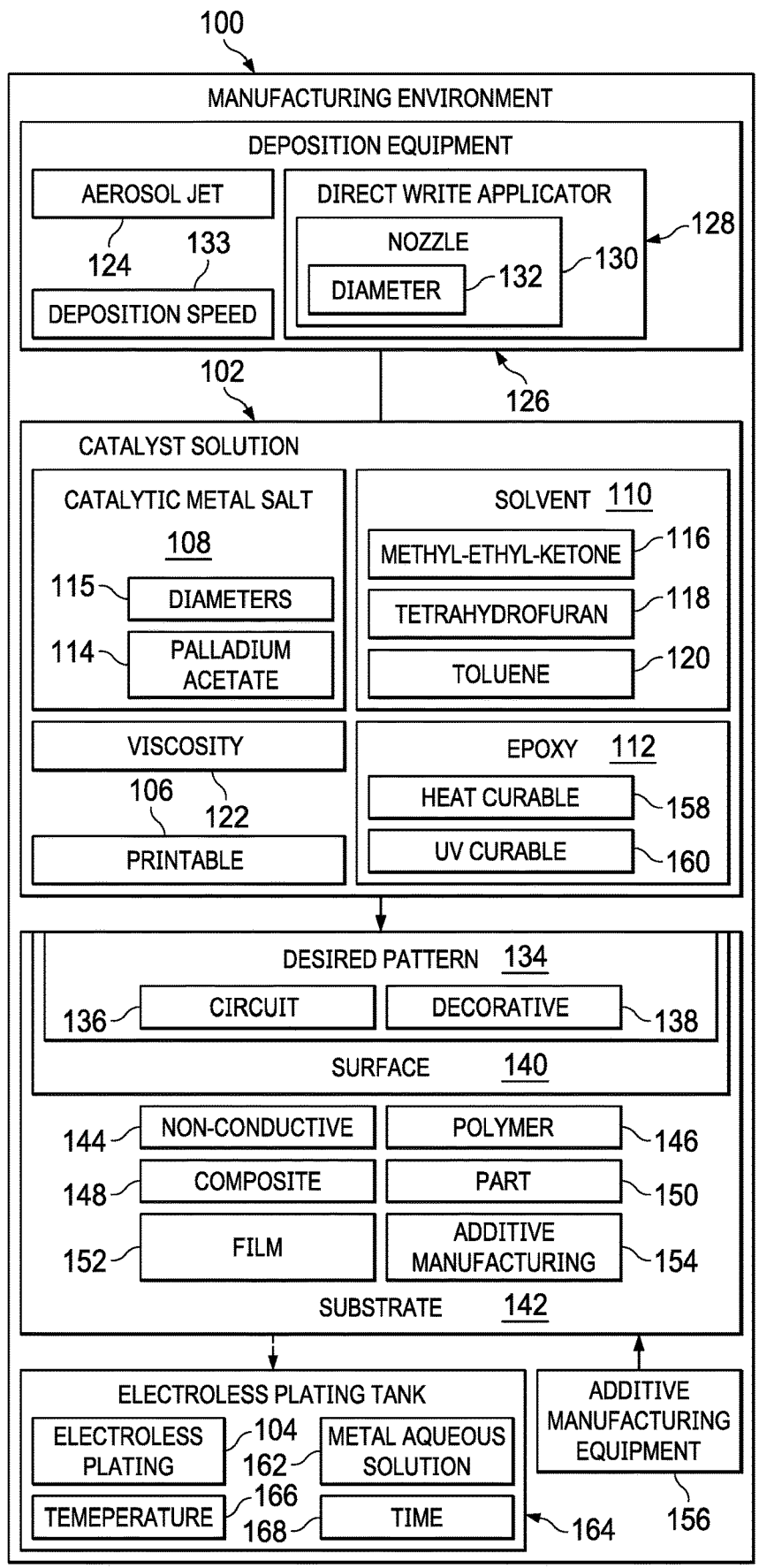
FIG. 1 is an illustration of a block diagram of a manufacturing environment in which a catalyst solution is applied in accordance with an illustrative embodiment.

Turning now to FIG. 1, an illustration of a block diagram of a manufacturing environment in which a catalyst solution is applied is depicted in accordance with an illustrative example. Manufacturing environment 100 includes catalyst solution 102 for electroless plating 104. Catalyst solution 102 is printable 106 and devoid of an amine. Catalyst solution 102 is printable 106 based on material properties of catalyst solution 102.

Catalyst solution 102 comprises catalytic metal salt 108, solvent 110, and epoxy 112. Catalyst solution 102 is non-amine-based but reduces metal ions in electroless plating 104. Catalytic metal salt 108 is solvent-soluble. In some illustrative examples, catalytic metal salt 108 comprises at least one of palladium, platinum, rhodium, iridium, osmium, ruthenium, copper, nickel, or silver. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

In some illustrative examples, catalytic metal salt 108 comprises at least one of palladium or platinum. In some illustrative examples, catalytic metal salt 108 comprises palladium acetate 114. In some illustrative examples, catalytic metal salt 108 is one of an acetate, a chloride, a sulfate, or a nitrate.

Characteristics of catalytic metal salt 108 are selected to be printable 106. Diameters 115 of particles of catalytic metal salt 108 are selected to be printable 106 with a desired deposition method. In some illustrative examples, diameters 115 of particles of catalytic metal salt 108 are selected to promote formation of a metal layer in electroless plating 104. In some illustrative examples, diameters 115 of particles of catalytic metal salt 108 are smaller than a desired nozzle 130 diameter 132 of a direct write applicator 128. In some illustrative examples, catalytic metal salt 108 is selected based on a desired resistivity of the resulting metal pattern.

Solvent 110 is selected based on the selection of epoxy 112 and catalytic metal salt 108. Solvent 110 is selected to place the selected epoxy 112 and the selected catalytic metal salt 108 into solution. In some illustrative examples, solvent 110 comprises at least one of methyl-ethyl-ketone 116, tetrahydrofuran 118, or toluene 120.

In some illustrative examples, catalyst solution 102 has a volume percentage of solvent 110 selected to provide viscosity 122 compatible with selected deposition equipment 126. In some illustrative examples, deposition equipment 126 may also be referred to as direct write applicator 128. In some illustrative examples, direct write processes can be described as "printing" conductive traces using metallic ink. In some illustrative examples, deposition equipment 126 takes the form of aerosol jet 124. Aerosol jet 124 includes atomization and deposition. Atomization for aerosol jet 124 is selected from ultrasonic or pneumatic atomization. A deposition head for aerosol jet 124 can be a macro deposition head, a micro deposition head, or a wide head. In some illustrative examples, a macro deposition head has nozzle/tip diameters in the range of 0.500 millimeters to 2.50 millimeters. In some illustrative examples, a macro deposition head has trace widths between 100 microns and 2000 microns. In some illustrative examples, a micro deposition head has nozzle/tip diameters in the range of 0.100 millimeters to 0.300 millimeters. In some illustrative examples, a micro deposition head has trace widths between 20 microns and 200 microns. In some illustrative examples, a wide head for aerosol jet 124 has a nozzle/tip width of 10 millimeters. In some illustrative examples, a trace thickness deposited by aerosol jet 124 is in the range of 2 micrometers to 3 micrometers per layer.

In some illustrative examples, catalyst solution 102 has a volume percentage of solvent 110 selected to provide viscosity 122 compatible with aerosol jet 124. In some illustrative examples, viscosity 122 is between 25 centipoise and 125 centipoise to enable spray coating.

In some illustrative examples, to form catalyst solution 102, catalytic metal salt 108 is dissolved in solvent 110 to form a first solution and epoxy 112 is mixed with solvent 110 separately to form a second solution. Afterwards, the first solution is added to the second solution to form a combination. In some illustrative examples, adding the first solution to the second solution forms catalyst solution 102. In some illustrative examples, additional solvent 110 is introduced to the combination to form catalyst solution 102. In some illustrative examples, additional solvent 110 is introduced to the combination to achieve a desired value for viscosity 122. In some illustrative examples, additional solvent 110 is introduced to the combination to achieve a desired mass ratio in catalyst solution 102.

Once formed, catalyst solution 102 is applied to surface 140 of substrate 142 in desired pattern 134 by deposition equipment 126. In some illustrative examples, deposition equipment 126 applies catalyst solution 102 at deposition speed 133 in the range of 20 millimeters/second to 40 millimeters/second.

Desired pattern 134 takes any desirable form for utilizing the conductivity of catalyst solution 102 and metal film formed by electroless plating 104. In some illustrative examples, desired pattern 134 takes the form of conductive wiring. In some illustrative examples, desired pattern 134 takes the form of circuit 136. In some illustrative examples, desired pattern 134 is decorative 138. Desired pattern 134 is applied to surface 140 of substrate 142 by deposition equipment 126.

Substrate 142 is a material in which conductivity of only portions of surface 140 is desirable. Substrate 142 takes any desirable form. By applying catalyst solution 102 and performing electroless plating 104, the conductivity of substrate 142 is manipulated. In some illustrative examples, substrate 142 comprises non-conductive material 144. In some illustrative examples, substrate 142 is formed of one of polymer 146 or composite 148. In some illustrative examples, substrate 142 takes the form of part 150. Part 150 is a component of a platform. The platform can take any desirable form. Although the illustrative examples for an illustrative embodiment below are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, an electronic device such as a phone, computer, tablet, sensor, and other suitable platforms. For example, when substrate 142 takes the form of part 150, substrate 142 can be a panel, a circuit, a faceplate, or any other desirable type of part. In other illustrative examples, substrate 142 takes the form of film 152.

Substrate 142 is formed in any desirable manner such that surface 140 has a roughness that enables directly depositing catalyst solution 102. Substrate 142 can be formed through molding, machining, or additive manufacturing 154. In some illustrative examples, when substrate 142 is formed by additive manufacturing 154, additive manufacturing equipment 156 is present in manufacturing environment 100.

After deposition of catalyst solution 102 to surface 140 of substrate 142, catalyst solution 102 is dried. In some illustrative examples, by drying catalyst solution 102, epoxy 112 is dried and solvent 110 is driven off. In some illustrative examples, epoxy 112 is heat curable 158 and epoxy 112 is dried and partially cured by applying heat. In some embodiments, epoxy 112 comprises heat curable 158 such as E3710 or EC2290. In some illustrative examples, epoxy 112 is UV curable 160.

Drying is performed at a time and temperature to evaporate solvent 110 and dry epoxy 112. By only partially curing epoxy 112, active sites of the catalyst are maintained. In some illustrative examples, the drying is performed at a temperature in the range of 75 degrees Celsius to 135 degrees Celsius. In some illustrative examples, the drying is performed for a time in the range of 5 minutes to 30 minutes.

After catalyst solution 102 is dried on substrate 142, substrate 142 is placed into electroless plating tank 164. Electroless plating 104 in electroless plating tank 164 does not utilize an electric current. Metal ions in metal aqueous solution 162 are reduced and deposited on the catalytically activated portions of surface 140. Metal ions in metal aqueous solution 162 are reduced and deposited onto the dried catalyst solution 102 in desired pattern 134. In some illustrative examples, metal aqueous solution 162 comprises at least one of nickel, cobalt, iron, or copper. In some illustrative examples, metal aqueous solution 162 comprises at least one of nickel, cobalt, iron, copper, gold, silver, palladium, platinum, rhodium, or ruthenium.

The thickness of the metal film deposited during electroless plating 104 is controlled by modifying the temperature 166 and time 168 of electroless plating 104. The thickness of the metal film deposited during electroless plating 104 is affected by the type and amount of catalytic metal salt 108.

In one example of forming catalyst solution 102, 0.25 grams of palladium acetate 114 is dissolved in 20 milliliters methyl-ethyl-ketone 116 and then mixed until dissolved in solution. Separately, 2 grams of epoxy 112, such as EC3710 from 3M, and 60 grams of toluene 120 are combined. Afterwards, the palladium acetate 114 solution is added to the epoxy 112 solution. An additional amount of methyl-ethyl-ketone 116 can be added to achieve desired mass ratios. In one illustrative example, the resulting catalyst solution 102 comprises 0.25 grams of palladium acetate 114, 2 grams of epoxy 112, 150 grams of methyl-ethyl-ketone 116, and 60 grams of toluene 120.

In another example of forming catalyst solution 102, 0.25 grams of palladium acetate 114 is dissolved in 20 milliliters methyl-ethyl-ketone 116 and then mixed until dissolved in solution. Separately, 2 grams of epoxy 112, such as EC3710 from 3M, and 40 grams of tetrahydrofuran 118 are combined. Afterwards, the palladium acetate solution is added to the epoxy solution. An additional amount of methyl-ethyl-ketone 116 can be added to achieve desired mass ratios. In one illustrative example, the resulting catalyst solution 102 comprises 0.25 grams of palladium acetate 114, 2 grams of epoxy 112, 159 grams of methyl-ethyl-ketone 116, and 40 grams of tetrahydrofuran 118.

Deposition of catalyst solution 102, drying of catalyst solution 102, and electroless plating 104 form a component comprising substrate 142 having surface 140, desired pattern 134 of metal nanoparticles and epoxy on surface 140 of substrate 142, and a metal film formed over only desired pattern 134 but not exposed portions of surface 140 of substrate 142. Deposition of catalyst solution 102 and electroless plating 104 can enable a variety of different technologies including embedded sensors, antennas, embedded lighting, electronic switches, wireless charging, decorative lighting, embedded heaters, and other technologies enabled by printed circuitry or printed metal wires.

The illustration of catalyst solution 102, substrate 142, and deposition equipment 126 in FIG. 1, is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, substrate 142 could have any desirable curvature. As another illustrative example, solvent 110 can take the form of another solvent other than methyl-ethyl-ketone 116, tetrahydrofuran 118, or toluene 120.

Figure 2:
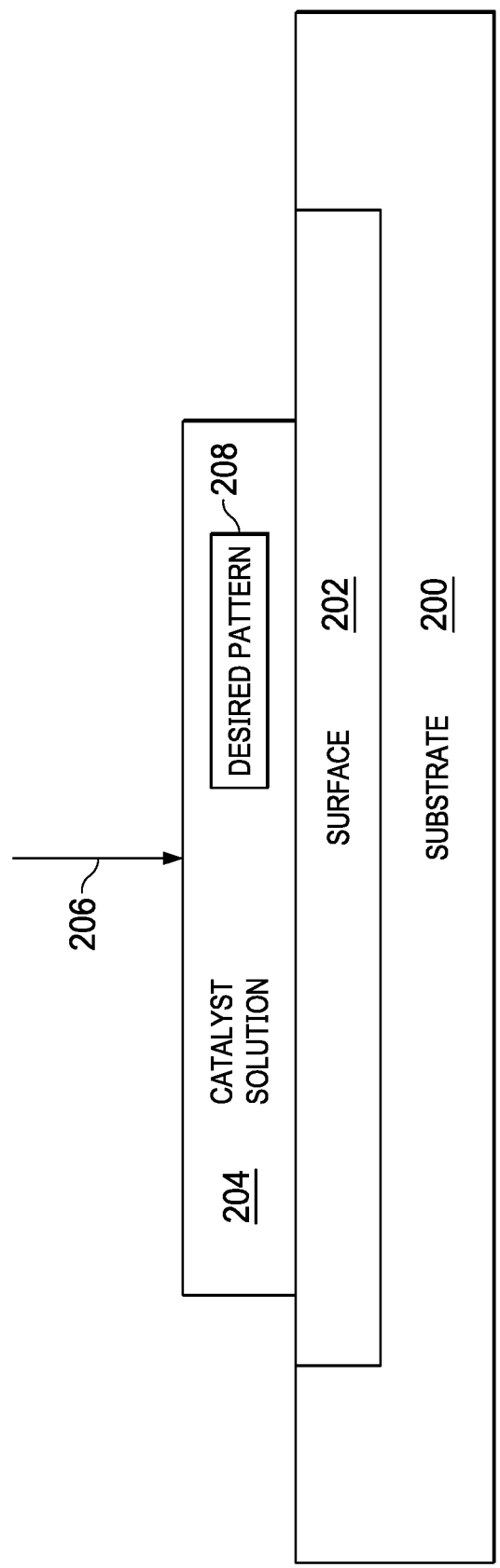
FIG. 2 is an illustration of a block diagram of a catalyst solution applied to a substrate in accordance with an illustrative embodiment.

Turning now to FIG. 2, an illustration of a block diagram of a catalyst solution applied to a substrate is depicted in accordance with an illustrative embodiment. Substrate 200 is an implementation of substrate 142 of FIG. 1. Substrate 200 can be formed using any desirable manufacturing technique that results in a desirable surface roughness for directly writing on surface 202. Substrate 200 can be formed using machining, molding, additive manufacturing, or any other desirable manufacturing method.

Substrate 200 has surface 202 upon which catalyst solution 204 is applied 206. Surface 202 is an implementation of surface 140 of FIG. 1. Although surface 202 appears planar due to the block diagram illustration, surface 202 can have any desirable curvature. In some illustrative examples, surface 202 comprises at least one of a curved surface or a complex surface. Surface 202 has any desirable surface roughness.

Catalyst solution 204 is an implementation of catalyst solution 102 of FIG. 1. Catalyst solution 204 is applied 206 using any desirable method. In some illustrative examples, catalyst solution 204 is deposited using a direct write applicator. In some illustrative examples, catalyst solution 204 is deposited using an aerosol jet.

Catalyst solution 204 is applied to a portion of surface 202 in desired pattern 208. Desired pattern 208 can take any desirable form. In some illustrative examples, desired pattern 208 takes the form of circuitry. In some illustrative examples, desired pattern 208 is decorative.

Figure 3:
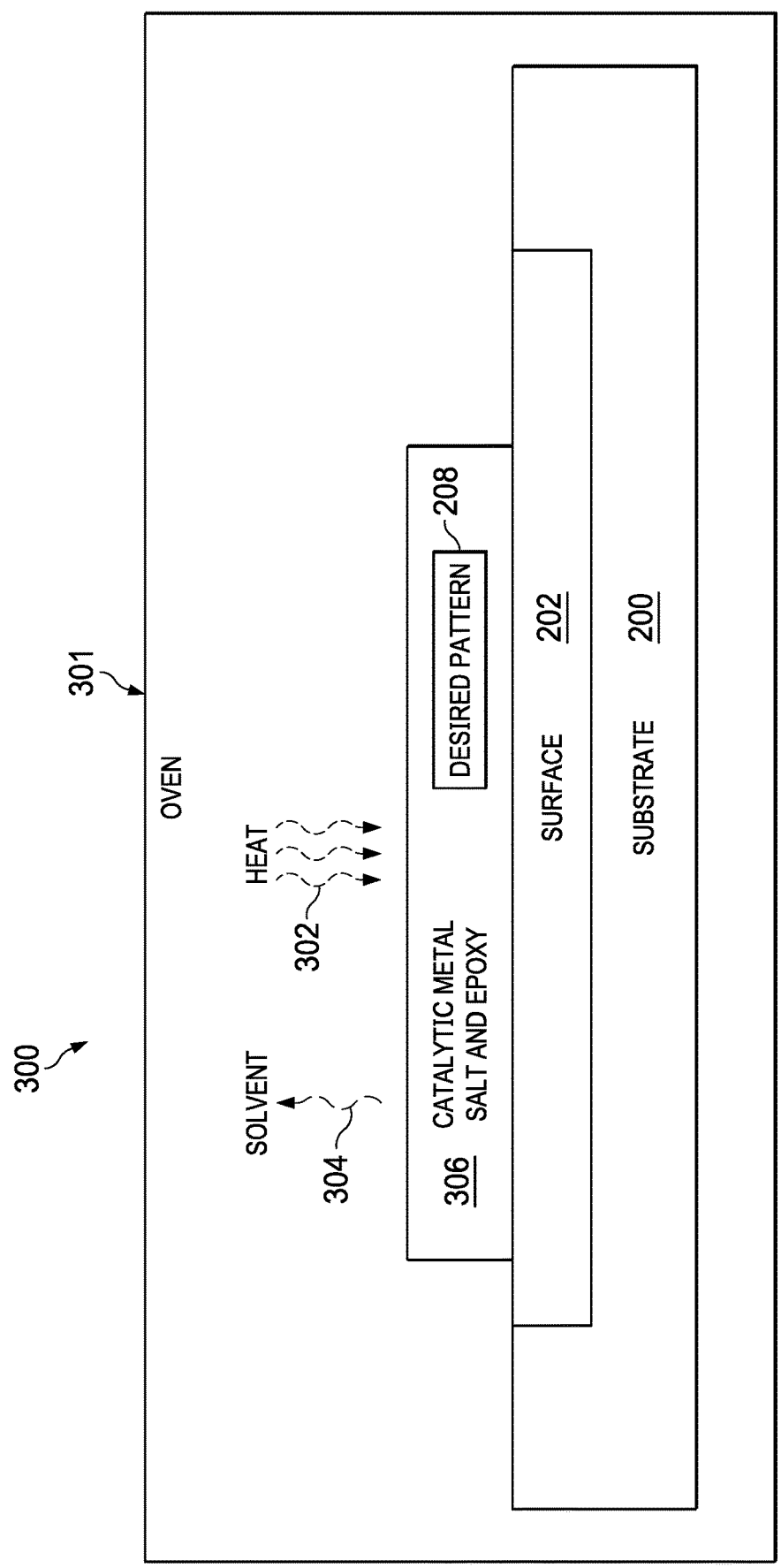
FIG. 3 is an illustration of a block diagram of a catalyst solution on a surface of a substrate in an oven in accordance with an illustrative embodiment.

Turning now to FIG. 3, an illustration of a block diagram of a catalyst solution on a surface of a substrate in an oven is depicted in accordance with an illustrative embodiment. View 300 is a view of substrate 200 of FIG. 2 in oven 301. View 300 is a view of drying catalyst solution 204 of FIG. 2 in desired pattern 208 on surface 202 of substrate 200 within oven 301. In view 300, oven 301 applies heat 302 to substrate 200 to dry catalyst solution 204 applied 206 in FIG. 2. Drying catalyst solution 204 in desired pattern 208 on surface 202 of substrate 200 drives off solvent 304 and dries the epoxy. Driving off solvent 304 forms catalytic metal salt and epoxy 306. The epoxy is dry in catalytic metal salt and epoxy 306.

Figure 4:
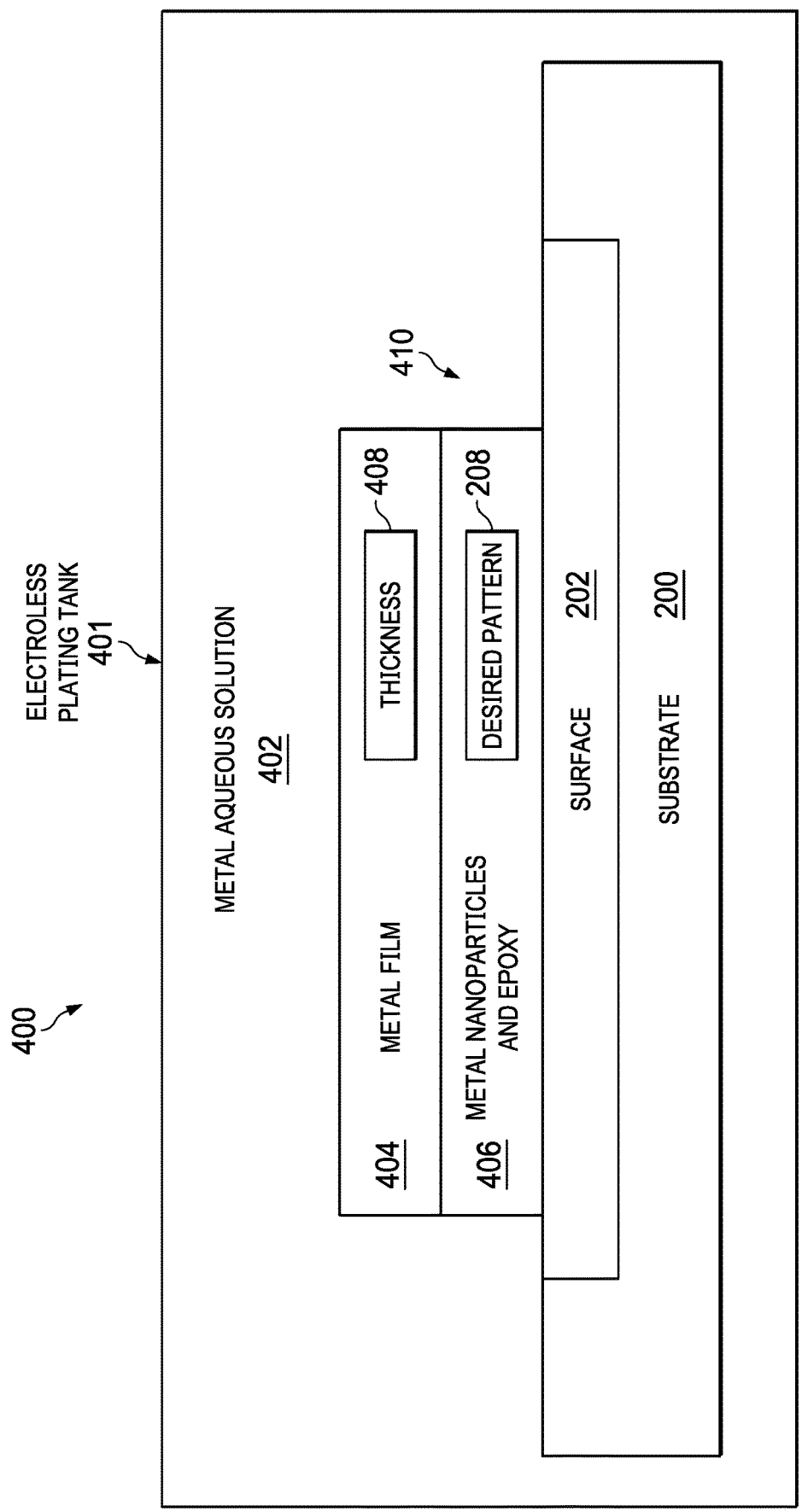
FIG. 4 is an illustration of a block diagram of a substrate in an electroless plating tank in accordance with an illustrative embodiment.

Turning now to FIG. 4, an illustration of a block diagram of a substrate in an electroless plating tank is depicted in accordance with an illustrative embodiment. View 400 is a view of substrate 200 following drying in oven 301 of FIG. 3. In view 400 substrate 200 is present in electroless plating tank 401. Electroless plating tank 401 contains metal aqueous solution 402. Metal aqueous solution 402 interacts with catalytic metal salt and epoxy 306 of FIG. 3 to deposit metal film 404.

Electroless plating in electroless plating tank 401 does not utilize an electric current. Metal ions in metal aqueous solution 402 are reduced and deposited on the catalytically activated portions of surface 202. Metal ions in metal aqueous solution 402 are reduced and deposited onto catalytic metal salt and epoxy 306 to form metal film 404. As catalytic metal salt and epoxy 306 interacts with metal aqueous solution 402, catalytic metal salt and epoxy 306 forms metal nanoparticles and epoxy 406 on surface 202.

Electroless plating in electroless plating tank 401 forms metal film 404 having a uniform thickness 408. Thickness 408 is affected by the time of electroless plating. Increasing the time of electroless plating increases thickness 408 of metal film 404. Increasing thickness 408 of metal film 404 reduces the resistivity of desired pattern 208.

Depositing metal film 404 using electroless plating forms component 410. Component 410 comprises substrate 200 having surface 202, desired pattern 208 of metal nanoparticles and epoxy 406 on surface 202 of substrate 200, and metal film 404 formed over only desired pattern 208 but not exposed portions of surface 202 of substrate 200.

Figure 5B:
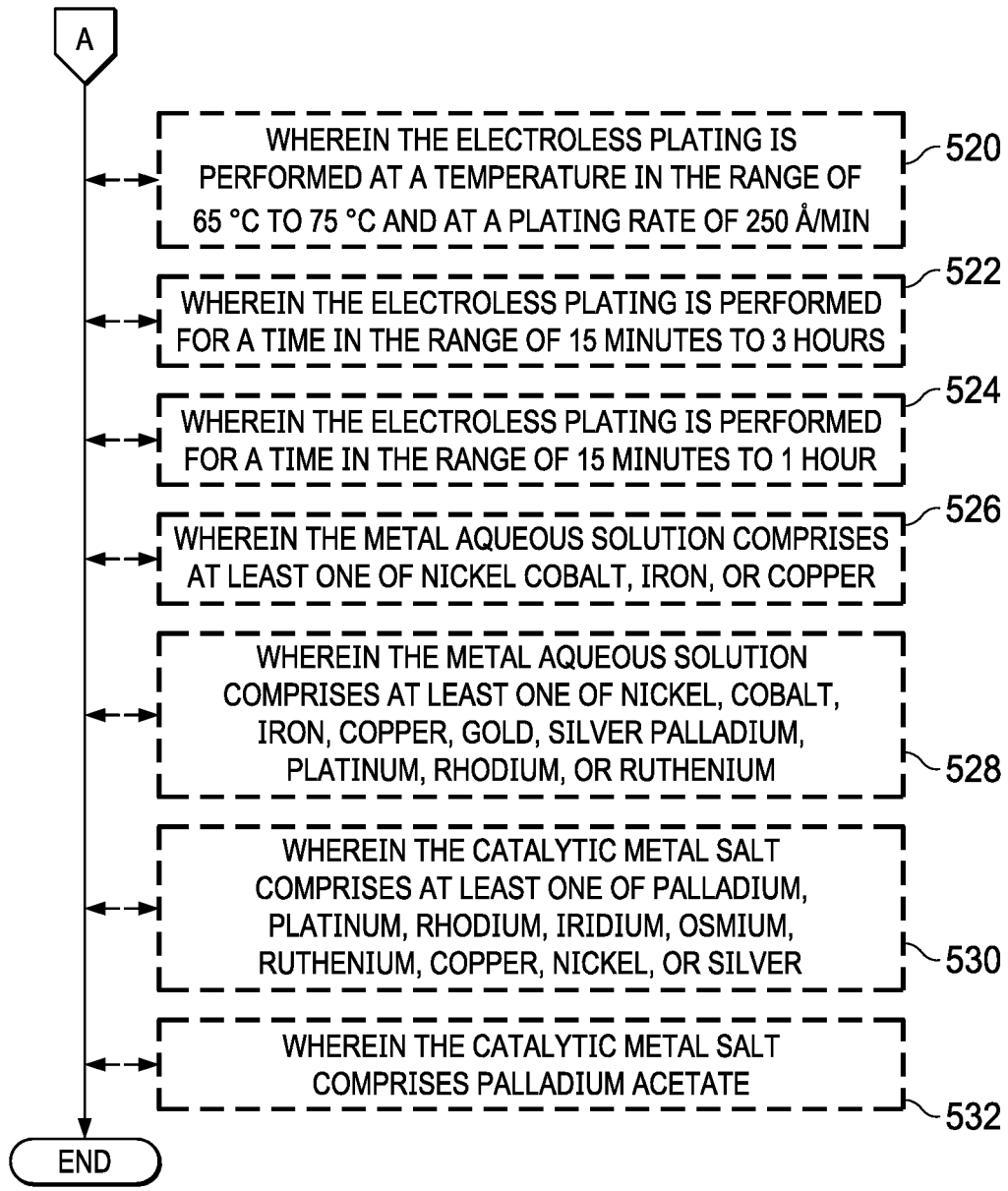

Turning now to FIGS. 5A and 5B, a flowchart of a method of directly writing a desired pattern of metal on a surface of a substrate is depicted in accordance with an illustrative embodiment. In some illustrative examples, method 500 can be performed to directly write desired pattern 134 on surface 140 of substrate 142 of FIG. 1. In some illustrative examples, method 500 can be used to apply catalyst solution 204 of FIG. 2, dry catalyst solution 204, and electroless plate substrate 200 in FIG. 4.

Method 500 directly writes a desired pattern of metal on a surface of a substrate. Method 500 selectively applies a printable catalyst solution devoid of an amine to a surface of a substrate in the desired pattern, the catalyst solution comprising a catalytic metal salt, a solvent, and an epoxy (operation 502).

Method 500 dries the catalyst solution in the desired pattern on the surface of the substrate (operation 504). Method 500 electroless plates the substrate in a metal aqueous solution (operation 506). Afterwards, method 500 may terminate.

In some illustrative examples, method 500 performs operation 502, operation 504, and operation 506 without intervening processing to the substrate. In some illustrative examples, method 500 performs operation 502, operation 504, and operation 506 without intervening neutralizing applied the substrate.

In some illustrative examples, method 500 generates the substrate using additive manufacturing (operation 508). The additive manufacturing generates a surface with a surface roughness within a range for direct writing of catalyst solution. In some illustrative examples, selectively applying the catalyst solution comprises aerosol jetting the catalyst solution onto the surface of the substrate (operation 510). In some illustrative examples, the aerosol jetting is done at a deposition speed in the range of 20 millimeters/second to 40 millimeters/second (operation 512).

In some illustrative examples, the electroless plating is performed at a temperature in the range of 50 degrees Celsius to 80 degrees Celsius and a plating rate in the range of 150 Å/minute to 325 Å/minute (operation 518). In some illustrative examples, the electroless plating is performed at a temperature in the range of 65 degrees Celsius to 75 degrees Celsius and at a plating rate of 250 Å/minute (operation 520). In some illustrative examples, the electroless plating is performed for a time in the range of 15 minutes to 3 hours (operation 522). In some illustrative examples, the electroless plating is performed for a time in the range of 15 minutes to 1 hour (operation 524).

In some illustrative examples, drying the catalyst solution in the desired pattern on the surface of the substrate comprises drying the catalyst solution in the desired pattern on the surface of the substrate within an oven (operation 514). In some illustrative examples, drying the catalyst solution in the desired pattern on the surface of the substrate drives off the solvent and dries the epoxy (operation 516).

In some illustrative examples, the metal aqueous solution comprises at least one of nickel, cobalt, iron, or copper (operation 526). In some illustrative examples, the metal aqueous solution comprises at least one of nickel, cobalt, iron, copper, gold, silver, palladium, platinum, rhodium, or ruthenium (operation 528).

In some illustrative examples, the catalytic metal salt (108) comprises at least one of palladium, platinum, rhodium, iridium, osmium, ruthenium, copper, nickel, or silver (operation 530). In some illustrative examples, the catalytic metal salt comprises palladium acetate (operation 532).

Figure 6:
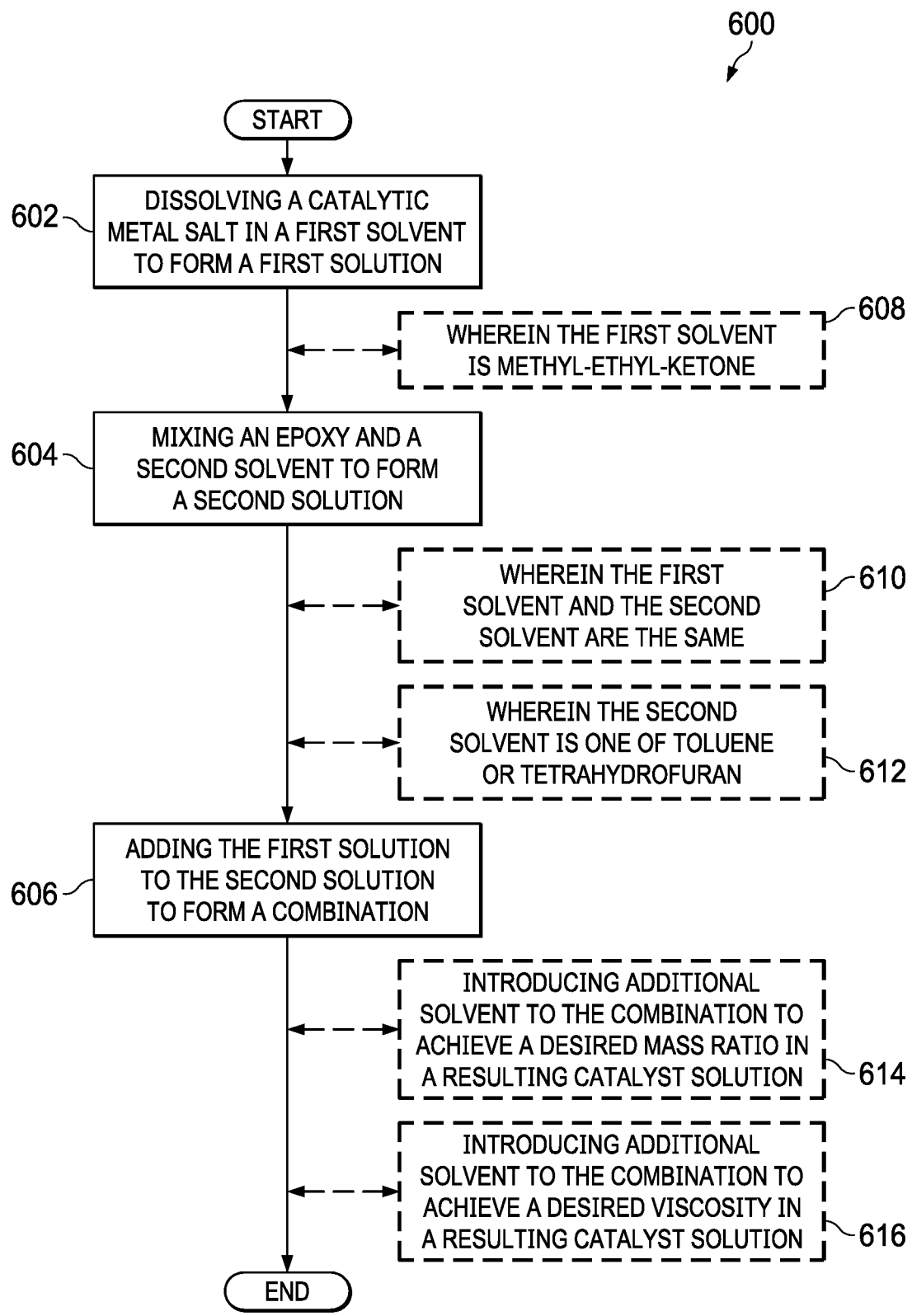
FIG. 6 is a flowchart of a method of forming a catalyst solution in accordance with an illustrative embodiment.

Turning now to FIG. 6, a flowchart of a method of forming a catalyst solution is depicted in accordance with an illustrative embodiment. In some illustrative examples, method 600 is used to form catalyst solution 102 of FIG. 1. In some illustrative examples, method 600 is used to form catalyst solution 204 of FIG. 2. In some illustrative examples, method 600 is used to form a catalyst solution to be used in method 500 of FIG. 5.

Method 600 dissolves a catalytic metal salt in a first solvent to form a first solution (operation 602). Method 600 mixes an epoxy and a second solvent to form a second solution (operation 604). Method 600 adds the first solution to the second solution to form a combination (operation 606). Afterwards, method 600 may terminate.

In some illustrative examples, the first solvent is methyl-ethyl-ketone (operation 608). In some illustrative examples, the first solvent and the second solvent are the same (operation 610). In some illustrative examples, the second solvent is one of toluene or tetrahydrofuran (operation 612). In some illustrative examples, additional solvent is introduced to the combination to achieve a desired mass ration in a resulting catalyst solution (operation 614). In some illustrative examples, additional solvent is introduced to the combination to achieve a desired viscosity in a resulting catalyst solution (operation 616).

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. As used herein, "a number of," when used with reference to items means one or more items.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 508 through operation 532 may be optional. As another example, any of operation 608 through operation 616 may be optional.

Figure 7:
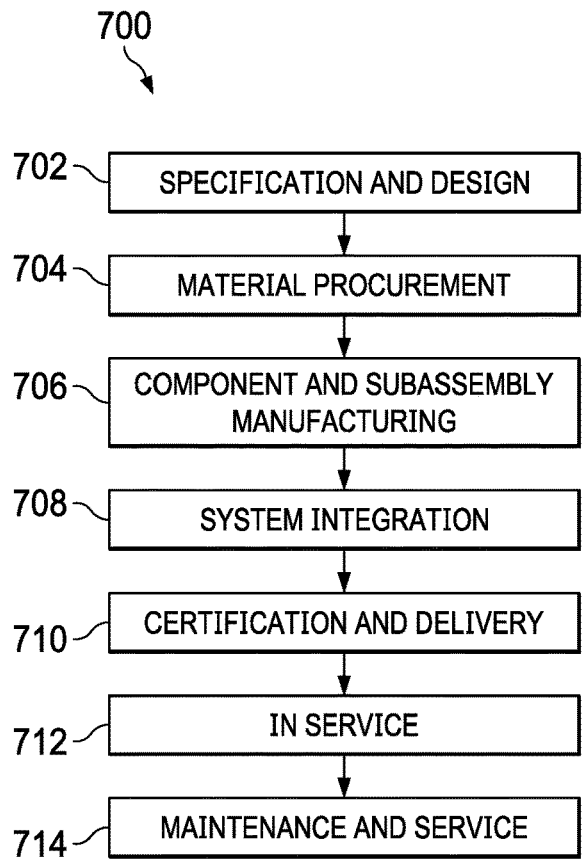
FIG. 7 is an illustration of an aircraft manufacturing and service method in a form of a block diagram in accordance with an illustrative embodiment.
Figure 8:
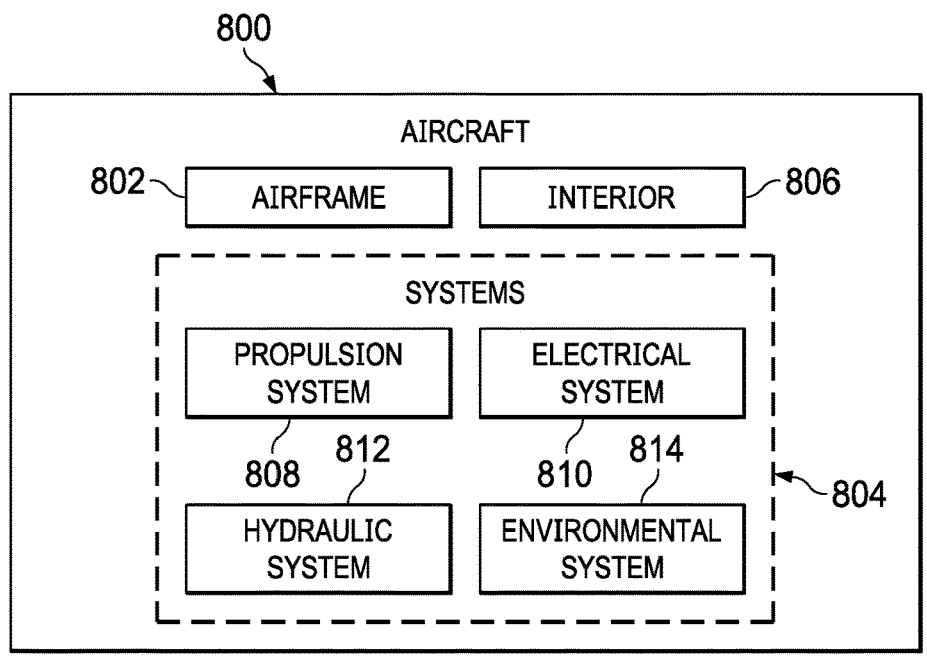
FIG. 8 is an illustration of an aircraft in a form of a block diagram in which an illustrative embodiment may be implemented.

Illustrative examples of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative examples may be manufactured or used during at least one of component and subassembly manufacturing 706, or maintenance and service 714 of FIG. 7. For example, components of aircraft 800 may manufactured using catalyst solution 102 of FIG. 1 during component and subassembly manufacturing 706. Replacement parts for aircraft 800 may be manufactured using catalyst solution 102 of FIG. 1 during maintenance and service 714 of FIG. 7. As another example, method 500 can be used to manufacture components of at least one of interior 806 or electrical system 810. Method 600 can be used to form a catalyst solution for manufacturing a component of at least one of interior 806 or electrical system 810.

The inclusion of an amine causes a catalyst solution to be incompatible with aerosol jetting. Accordingly, the catalyst solutions described herein do not include amines. Epoxy is included in the catalyst solution to enable the catalytic metal salt to be sprayed via aerosol spraying into desired patterns and then dried to adhere to the surface for electroless plating.

The illustrative examples provide a catalyst solution, such as Palladium catalyst, to seed the surface of a substrate. The illustrative examples then follow with electroless plating to provide for greater concentrations of conductive materials deposited to meet a designed conductivity.

The illustrative examples do not require additional steps between the applying the catalyst solution, drying the catalyst solution, and the electroless plating. The illustrative examples also do not require sensitizing or neutralizing steps prior to or between the applying the catalyst solution, drying the catalyst solution, and the electroless plating.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of directly writing a desired pattern of metal on a surface of a substrate, the method comprising:

selectively applying a printable catalyst solution devoid of an amine to a surface of a substrate in the desired pattern, the catalyst solution comprising a catalytic metal salt, a solvent, and an epoxy;

drying the catalyst solution in the desired pattern on the surface of the substrate; and electroless plating the substrate in a metal aqueous solution, wherein the solvent comprises at least one of tetrahydrofuran, and toluene, and wherein the catalytic metal salt comprises one of a chloride, a sulfate, and a nitrate.

2. The method of claim 1 further comprising:

generating the substrate using additive manufacturing.

3. The method of claim 1, wherein selectively applying the catalyst solution comprises aerosol jetting the catalyst solution onto the surface of the substrate.

4. The method of claim 3, wherein the aerosol jetting is done at a deposition speed in a range of 20 millimeter/second to 40 millimeter/second.

5. The method of claim 1, wherein the electroless plating is performed at a temperature in a range of 50 degrees Celsius to 80 degrees Celsius and a plating rate in a range of 150 Å/minute to 325 Å/minute.

6. The method of claim 1, wherein the electroless plating is performed at a temperature in a range of 65 degrees Celsius to 75 degrees Celsius and at a plating rate of 250 Å/minute.

7. The method of claim 1, wherein the electroless plating is performed for a time in a range of 15 minutes to 3 hours.

8. The method of claim 1, wherein the electroless plating is performed for a time in a range of 15 minutes to 1 hour.

9. The method of claim 1, wherein drying the catalyst solution in the desired pattern on the surface of the substrate comprises drying the catalyst solution in the desired pattern on the surface of the substrate within an oven.

10. The method of claim 1, wherein drying the catalyst solution in the desired pattern on the surface of the substrate drives off the solvent and dries the epoxy.

11. The method of claim 1, wherein the metal aqueous solution comprises at least one of nickel, cobalt, iron, or copper.

12. The method of claim 1, wherein the metal aqueous solution comprises at least one of nickel, cobalt, iron, copper, gold, silver, palladium, platinum, rhodium, or ruthenium.

13. The method of claim 1, wherein the catalytic metal salt comprises at least one of palladium, platinum, rhodium, iridium, osmium, ruthenium, copper, nickel, or silver.

14. The method of claim 1, wherein the catalytic metal salt comprises palladium acetate.

15. The method of claim 1, wherein the substrate comprises a non-conductive material.

16. The method of claim 1, wherein the surface is at least one of a curved surface or a complex surface.

17. The method of claim 1, wherein the substrate comprises a composite or a polymer.

18. The method of claim 1, wherein drying the catalyst solution in the desired pattern on the surface of the substrate partially cures the epoxy.

19. The method of claim 1, wherein drying the catalyst solution in the desired pattern on the surface of the substrate is performed at a temperature in a range of 75 degrees Celsius to 135 degrees Celsius.

20. The method of claim 1, wherein drying the catalyst solution in the desired pattern on the surface of the substrate is performed for a time in a range of 5 minutes to 30 minutes.

21. The method of claim 1 further comprising:
modifying a time and a temperature of the electroless plating to control a thickness of a metal film deposited during the electroless plating.

22. A method of directly writing a desired pattern of metal on a surface of a substrate, the method comprising:
selectively applying a printable catalyst solution devoid of an amine to a surface of a substrate in the desired pattern, the catalyst solution comprising a catalytic metal salt, a solvent, and an epoxy;
drying the catalyst solution in the desired pattern on the surface of the substrate; and
electroless plating the substrate in a metal aqueous solution,
wherein the solvent comprises at least one of tetrahydrofuran, and toluene,
wherein the catalytic metal salt comprises one of a chloride, a sulfate, and a nitrate, and
wherein the metal aqueous solution comprises at least one of nickel, cobalt, iron, gold, silver, palladium, platinum, rhodium, and ruthenium.

23. A method of directly writing a desired pattern of metal on a surface of a substrate, the method comprising:
selectively applying a printable catalyst solution devoid of an amine to a surface of a substrate in the desired pattern, the catalyst solution comprising a catalytic metal salt, a solvent, and an epoxy;
drying the catalyst solution in the desired pattern on the surface of the substrate; and
electroless plating the substrate in a metal aqueous solution,
wherein the solvent comprises at least one of tetrahydrofuran, and toluene,
wherein the catalytic metal salt comprises one of a chloride, a sulfate, and a nitrate, and
wherein the catalytic metal salt comprises at least one of platinum, rhodium, iridium, osmium, ruthenium, copper, nickel, and silver.

* * * * *